United States Patent
Fan et al.

(10) Patent No.: US 12,069,485 B2
(45) Date of Patent: Aug. 20, 2024

(54) METHODS AND DEVICES FOR FREQUENCY BAND SHARING

(71) Applicant: Telefonaktiebolaget LM Ericsson (publ), Stockholm (SE)

(72) Inventors: Rui Fan, Beijing (CN); Mattias Frenne, Uppsala (SE); Robert Baldemair, Solna (SE); Håkan B. Björkegren, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 365 days.

(21) Appl. No.: 17/613,707

(22) PCT Filed: May 31, 2019

(86) PCT No.: PCT/CN2019/089604
§ 371 (c)(1),
(2) Date: Nov. 23, 2021

(87) PCT Pub. No.: WO2020/237653
PCT Pub. Date: Dec. 3, 2020

(65) Prior Publication Data
US 2022/0231827 A1 Jul. 21, 2022

(51) Int. Cl.
*H04W 16/14* (2009.01)
*H04L 5/00* (2006.01)
(Continued)

(52) U.S. Cl.
CPC ........... *H04W 16/14* (2013.01); *H04L 5/0053* (2013.01); *H04W 72/0446* (2013.01);
(Continued)

(58) Field of Classification Search
CPC ............. H04W 16/14; H04W 72/0446; H04W 72/1215; H04W 88/06; H04L 5/0053
See application file for complete search history.

(56) References Cited

U.S. PATENT DOCUMENTS

| 2018/0192404 A1* | 7/2018 | Maaref | H04L 5/0094 |
| 2019/0261372 A1 | 8/2019 | Zhou et al. | |

(Continued)

FOREIGN PATENT DOCUMENTS

| CN | 102624466 A | 8/2012 |
| CN | 104685822 A | 6/2015 |

(Continued)

OTHER PUBLICATIONS

Wan, L., et al., "Enabling Efficient 5G and 4G LTE Coexistence", IEEE Wireless Communications, Feb. 2019, pp. 6-8.

*Primary Examiner* — Kevin C. Harper
(74) *Attorney, Agent, or Firm* — COATS & BENNETT, PLLC

(57) ABSTRACT

The present disclosure provides a method (200) at a network device (120; 1210). The method (200) includes: determining (210) a first time period (325) corresponding to a subframe (320) in a frame (310) of a first radio access technology (RAT) and transmitting (220) a downlink system signal (340) of a second RAT in the first time period (325). The first RAT operates in time division duplex (TDD) mode and a first frequency band, and the second RAT operates in a second frequency band that at least partially overlaps with the first frequency band. The subframe (320) includes a guard period (GP) (330) used for switching between downlink and uplink in the frame (310) of the first RAT.

19 Claims, 9 Drawing Sheets

(51) Int. Cl.
*H04W 72/0446* (2023.01)
*H04W 72/12* (2023.01)
*H04W 88/06* (2009.01)
*H04L 5/14* (2006.01)

(52) U.S. Cl.
CPC ....... *H04W 72/1215* (2013.01); *H04W 88/06* (2013.01); *H04L 5/1469* (2013.01)

(56) References Cited

U.S. PATENT DOCUMENTS

| | | | |
|---|---|---|---|
| 2019/0380138 A1* | 12/2019 | Zhang | H04L 1/1819 |
| 2020/0008195 A1 | 1/2020 | Wang et al. | |
| 2020/0028642 A1 | 1/2020 | He et al. | |
| 2020/0322037 A1* | 10/2020 | Abedini | H04W 24/10 |
| 2021/0410184 A1* | 12/2021 | Talarico | H04L 5/005 |

FOREIGN PATENT DOCUMENTS

| | | | |
|---|---|---|---|
| CN | 108024348 A | | 5/2018 |
| CN | 108667579 A | | 10/2018 |
| EP | 3425837 A1 | | 1/2019 |
| WO | 2013112983 A2 | | 8/2013 |
| WO | 2016040036 A1 | | 3/2016 |
| WO | 2019096081 A1 | | 5/2019 |

\* cited by examiner

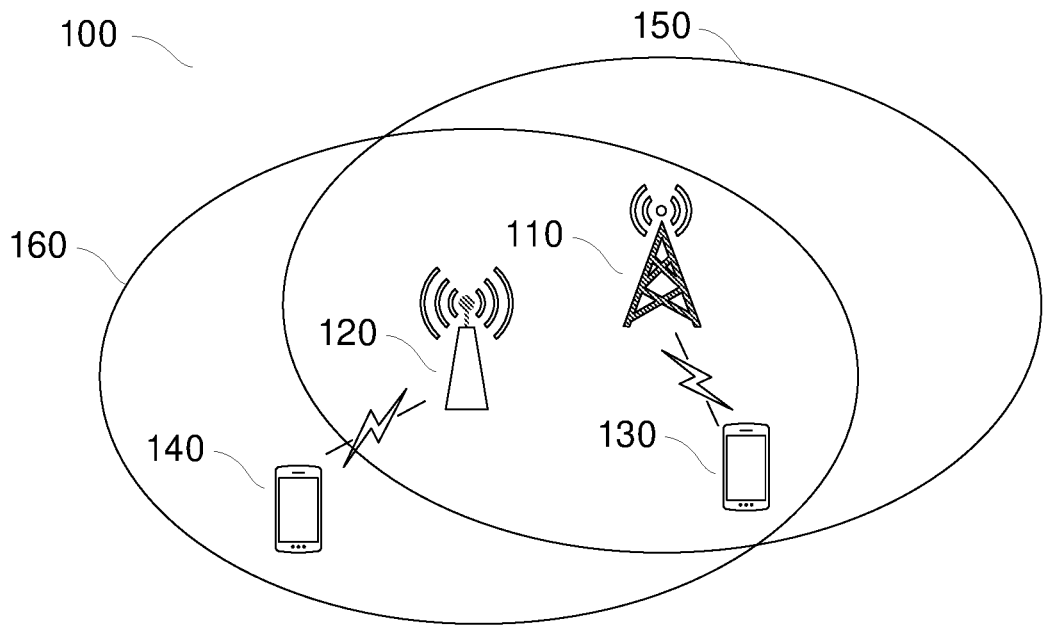

Fig. 1

210 — Determining a first time period corresponding to a subframe in a frame of a first RAT, wherein the first RAT operates in TDD mode and a first frequency band, and the subframe comprises a guard period used for switching between downlink and uplink in the frame of the first RAT 220 — Transmitting a downlink system signal of a second RAT in the first time period, wherein the second RAT operates in a second frequency band that at least partially overlaps with the first frequency band

Fig. 2

METHODS AND DEVICES FOR FREQUENCY BAND SHARING

TECHNICAL FIELD

The present disclosure relates to wireless communication, and more particularly, to methods and devices for frequency band sharing.

BACKGROUND

Radio frequency spectrum is a valuable but limited resource for wireless communication. Different radio access technologies (RATs) may have to use overlapped or even the same frequency bands due to the limited spectrum resource. For example, the $5^{th}$ generation (5G) or New Radio (NR) communication system can operate at lower frequencies (e.g., below 6 GHz) and higher frequencies (above 24 GHz). However, most of the lower frequency bands have already been allocated to Long-Term Evolution (LTE). As a result, in the scenario of operating at the lower frequencies, the NR systems may have to operate at a frequency band that is at least partially overlapped with that of the $4^{th}$ generation (4G) or LTE communication systems. In other words, the NR systems and the LTE systems may have to share the frequency band.

SUMMARY

Methods, devices, computer-readable storage media and computer program products are provided to enable the frequency band sharing between different RATs.

In a first aspect of the present disclosure, a method at a network device is provided. The method may include determining a first time period corresponding to a subframe in a frame of a first RAT and transmitting a downlink system signal of a second RAT in the first time period. The first RAT may operate in time division duplex (TDD) mode and a first frequency band, and the second RAT may operate in a second frequency band that at least partially overlaps with the first frequency band. The subframe may comprise a guard period (GP) used for switching between downlink and uplink in the frame of the first RAT.

According to an embodiment, the downlink system signal may occupy a second time period that is not configured to transmit system signals according to the first RAT.

According to an embodiment, frames of the first RAT may be time aligned with frames of the second RAT.

According to an embodiment, one or more empty symbols may be positioned between the downlink system signal and subsequent signals in the frame of the first RAT. No transmission occurs during a third time period corresponding to the one or more empty symbols.

According to an embodiment, the one or more empty symbols may comprise at least two empty symbols, or the number of the one or more empty symbols may depend on a size of a cell of the first RAT.

According to an embodiment, the downlink system signal may comprise synchronization signals of the second RAT.

According to an embodiment, the subframe may further comprise a first portion and a second portion.

According to an embodiment, the GP may be positioned between the first portion and the second portion.

According to an embodiment, according to the first RAT, the first portion may be configured to transmit downlink signals, and/or the second portion may be configured to transmit uplink signals.

According to an embodiment, the downlink system signal may be transmitted in at least one of a fourth time period corresponding to the GP, a fifth time period corresponding to the first portion of the subframe or a sixth time period corresponding to the second portion of the subframe.

According to an embodiment, at least part of the downlink system signal may be transmitted in the fourth time period.

According to an embodiment, the fifth time period may be used to transmit both downlink signals of the first RAT and the downlink system signal.

According to an embodiment, the first RAT may be Long Term Evolution (LTE), and/or the second RAT may be New Radio (NR).

According to an embodiment, the subframe may be a special subframe of LTE TDD, the first portion of the subframe may be a downlink pilot time slot (DwPTS) and the second portion of the subframe may be an uplink pilot time slot (UpPTS).

According to an embodiment, the special subframe of LTE TDD may use one of Configuration 0, Configuration 1, Configuration 2, Configuration 3 or Configuration 5, and the downlink system signal may be transmitted in the fourth time period.

According to an embodiment, the downlink system signal may be transmitted in the fourth time period and the fifth time period.

According to an embodiment, the special subframe of LTE TDD may use Configuration 1 or Configuration 6, and the fifth time period may be used to transmit both the downlink system signal and downlink LTE signals.

According to an embodiment, the downlink system signal may comprise at least one of Synchronization Signal Block (SSB), Channel State Information Reference Signal (CSI-RS) or Tracking Reference Signal (TRS).

In a second aspect of the present disclosure, a method at a terminal device is provided. The method may include receiving a downlink system signal of a second RAT and obtaining system information of the second RAT from the received downlink system signal. The downlink system signal may be transmitted in a first time period corresponding to a subframe in a frame of a first RAT. The first RAT may operate in TDD mode and a first frequency band, and the second RAT may operate in a second frequency band that at least partially overlaps with the first frequency band. The subframe may comprise a guard period used for switching between downlink and uplink in the frame.

In a third aspect of the present disclosure, a network device is provided. The network device may include a processor and a memory configured to store instructions. The instructions, when executed by the processor, cause the network device to determine a first time period corresponding to a subframe in a frame of a first RAT and transmit a downlink system signal of a second RAT in the first time period. The first RAT may operate in TDD mode and a first frequency band, and the second RAT may operate in a second frequency band that at least partially overlaps with the first frequency band. The subframe may comprise a guard period used for switching between downlink and uplink in the frame of the first RAT.

In a fourth aspect of the present disclosure, a terminal device is provided. The terminal device may include a processor and a memory configured to store instructions. The instructions, when executed by the processor, cause the terminal device to receive a downlink system signal of a second RAT and obtain system information of the second RAT from the received downlink system signal. The downlink system signal may be transmitted in a first time period corresponding to a subframe in a frame of a first RAT. The first RAT may operate in TDD mode and a first frequency band, and the second RAT may operate in a second frequency band that at least partially overlaps with the first frequency band. The subframe may comprise a guard period used for switching between downlink and uplink in the frame.

In a fifth aspect of the present disclosure, a computer readable storage medium is provided. The computer readable storage medium has instructions stored thereon, which, when executed by a processor of a network device, cause the network device to perform the method according to the above first aspect.

In a sixth aspect of the present disclosure, a computer readable storage medium is provided. The computer readable storage medium has instructions stored thereon, which, when executed by a processor of a terminal device, cause the terminal device to perform the method according to the above second aspect.

In a seventh aspect of the present disclosure, an apparatus is provided. The apparatus may include a determining unit and a transmitting unit. The determining unit may be configured to determine a first time period corresponding to a subframe in a frame of a first RAT, and the transmitting unit may be configured to transmit a downlink system signal of a second RAT in the first time period. The first RAT may operate in TDD mode and a first frequency band, and the second RAT may operate in a second frequency band that at least partially overlaps with the first frequency band. The subframe may comprise a guard period used for switching between downlink and uplink in the frame of the first RAT.

In an eighth aspect of the present disclosure, an apparatus is provided. The apparatus may include a receiving unit and an obtaining unit. The receiving unit may be configured to receive a downlink system signal of a second RAT and the obtaining unit may be configured to obtain system information of the second RAT from the received downlink system signal. The downlink system signal may be transmitted in a first time period corresponding to a subframe in a frame of a first RAT. The first RAT may operate in TDD mode and a first frequency band, and the second RAT may operate in a second frequency band that at least partially overlaps with the first frequency band. The subframe may comprise a guard period used for switching between downlink and uplink in the frame.

In a ninth aspect of the present disclosure, a communication system including a host computer is provided. The host computer includes processing circuitry configured to provide user data, and a communication interface configured to forward the user data to a cellular network for transmission to a user equipment (UE). The cellular network comprises a base station having a radio interface and processing circuitry. The base station's processing circuitry may be configured to determine a first time period corresponding to a subframe in a frame of a first RAT and transmit a downlink system signal of a second RAT in the first time period. The first RAT may operate in TDD mode and a first frequency band, and the second RAT may operate in a second frequency band that at least partially overlaps with the first frequency band. The subframe may comprise a guard period used for switching between downlink and uplink in the frame of the first RAT.

In a tenth aspect of the present disclosure, a method implemented in a communication system including a host computer, a base station and a UE is provided. The method may include, at the host computer, providing user data at the host computer, and initiating a transmission carrying the user data to the UE via a cellular network comprising the base station. The base station may determine a first time period corresponding to a subframe in a frame of a first RAT and transmit a downlink system signal of a second RAT in the first time period. The first RAT may operate in TDD mode and a first frequency band, and the second RAT may operate in a second frequency band that at least partially overlaps with the first frequency band. The subframe may comprise a guard period used for switching between downlink and uplink in the frame of the first RAT.

In an eleventh aspect of the present disclosure, a communication system including a host computer is provided. The host computer includes processing circuitry configured to provide user data, and a communication interface configured to forward the user data to a cellular network for transmission to a UE. The UE includes a radio interface and processing circuitry. The UE's processing circuitry may be configured to receive a downlink system signal of a second RAT and obtain system information of the second RAT from the received downlink system signal. The downlink system signal may be transmitted in a first time period corresponding to a subframe in a frame of a first RAT. The first RAT may operate in TDD mode and a first frequency band, and the second RAT may operate in a second frequency band that at least partially overlaps with the first frequency band. The subframe may comprise a guard period used for switching between downlink and uplink in the frame.

In a twelfth aspect of the present disclosure, a method implemented in a communication system including a host computer, a base station and a UE is provided. The method may include, at the host computer, providing user data at the host computer, and initiating a transmission carrying the user data to the UE via a cellular network comprising the base station. The UE may receive a downlink system signal of a second RAT and obtain system information of the second RAT from the received downlink system signal. The downlink system signal may be transmitted in a first time period corresponding to a subframe in a frame of a first RAT. The first RAT may operate in TDD mode and a first frequency band, and the second RAT may operate in a second frequency band that at least partially overlaps with the first frequency band. The subframe may comprise a guard period used for switching between downlink and uplink in the frame.

With the embodiments of the present disclosure, different RATs can coexist in a common frequency band e.g., by avoiding the collision of the downlink system signal of the second RAT with the first RAT.

BRIEF DESCRIPTION OF THE DRAWINGS

The above and other objects, features and advantages will be more apparent from the following description of embodiments with reference to the figures, in which:

FIG. 1 is a schematic diagram illustrating an exemplary wireless communication network according to embodiments of the present disclosure;

FIG. 2 is a flowchart illustrating a method at the network device according to embodiments of the present disclosure;

DETAILED DESCRIPTION

Figure 3:
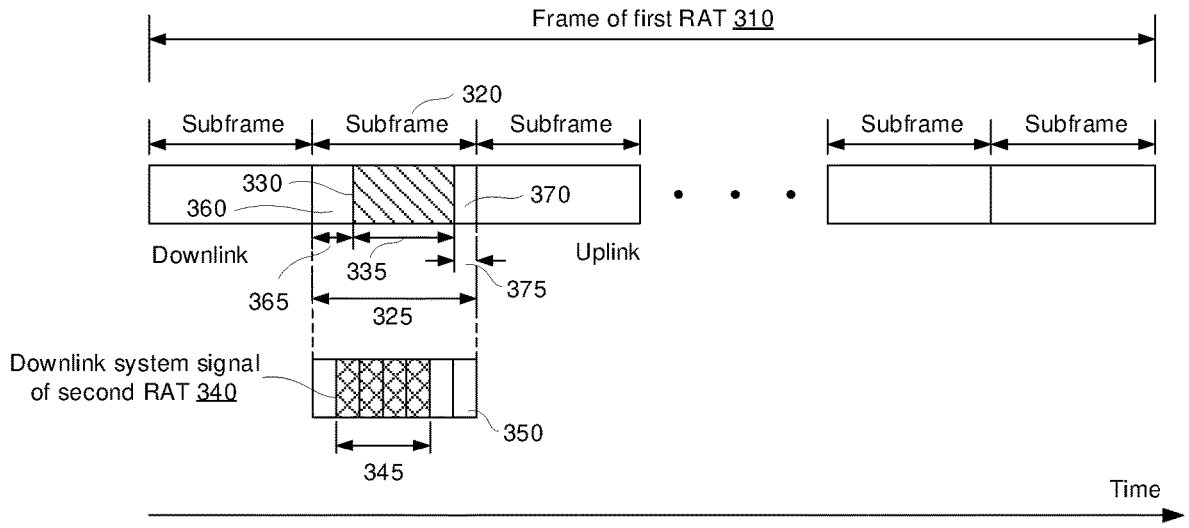
FIG. 3 is a schematic diagram illustrating the correspondence between an exemplary frame of the first RAT and the downlink system signal of the second RAT according to embodiments of the present disclosure.

As used herein, the term "wireless communication network" refers to a network following any suitable wireless communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), LTE, and/or other suitable 1G, 2G, 2.5G, 2.75G, 3G, 4G, 4.5G, 5G, 6G communication protocols; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" or "network node" refers to a device in a communication network via which a terminal device accesses the network and receives services therefrom. Examples of the network device may include a base station (BS), an access point (AP), or any other suitable device in the wireless communication network. The BS may be, for example, a node B (NodeB or NB), an evolved NodeB (eNodeB or eNB), a next generation NodeB (gNodeB or gNB), a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes, positioning nodes or the like. More generally, however, the network device may represent any suitable device (or group of devices) capable, configured, arranged, and/or operable to enable and/or provide a terminal device access to the wireless communication network or to provide some service to a terminal device that has access to the wireless communication network.

The term "terminal device" refers to any end device that can access a wireless communication network and receive services therefrom. By way of example and not limitation, the terminal device may refer to a mobile terminal, a user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, mobile phones, cellular phones, smart phones, tablets, personal digital assistants (PDAs), wearable devices, vehicle-mounted wireless terminal devices, wireless endpoints, or the like.

In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. As a further example, a UE may represent a device that is intended for sale to, or operation by, a human user but that may not initially be associated with a specific human user.

As yet another example, in an Internet of Things (IOT) scenario, a terminal device may represent a machine or other device that performs monitoring, sensing and/or measurements, and transmits the results of such monitoring, sensing and/or measurements to another terminal device and/or network equipment. The terminal device may in this case be a machine-to-machine (M2M) device, which may in a 3GPP context be referred to as a machine-type communication (MTC) device.

As used herein, a downlink transmission refers to a transmission from a network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/ or combinations thereof.

In the following description and claims, unless defined otherwise, all technical and scientific terms used herein have the same meaning as commonly understood by one of ordinary skills in the art to which this disclosure belongs.

FIG. 1 is a schematic diagram illustrating an exemplary wireless communication network 100 according to embodiments of the present disclosure. As shown in FIG. 1, the wireless communication network 100 may include one or more network devices, e.g., network devices 110 and 120. The network devices 110 and 120 may operate in different RATs and their cells are at least partially overlapped. More specifically, the network device 110 may provide radio connectivity to a set of terminal devices (e.g., the terminal device 130) within a cell 150 using a first RAT, while the network device 120 may provide radio connectivity to another set of terminal devices (e.g., the terminal device 140) within another cell 160 using a second RAT. As an example, the first RAT may be LTE and the network device 110 may be eNB, while the second RAT may be NR and the network device 120 may be gNB. However, it would be appreciated that these are only examples but not limitation. The RATs used by the network devices 110 and 120 may be other RATs than LTE or NR, such as GSM, UMTS, Wi-Fi, or those to be developed in the future. The network devices 110 and 120 could also be in other forms than the eNB or gNB, such as Node B, Base Transceiver Station (BTS), Base Station Subsystem (BSS), access point (AP) or the like.

It would be appreciated that the network devices 110 and 120 can be implemented in different physical devices, such as devices at different locations, or separate devices or modules at the same location. Alternatively, they can be implemented in the same physical device or module with different software configurations. It would also be appreciated that the terminal devices 130 and 140 can be different physical devices, or be the same physical device having operating modes for both the first and second RATs.

In the case where the network devices 110 and 120 operate in different RATs and at frequency bands that are at least partially overlapped, there may be collisions between the resources used by the two RATs.

Take LTE and NR that operate in the same frequency band as an example.

In LTE, the cell reference signal (CRS) is dense in downlink (DL) subframes. For example, the CRS usually occupies symbols with indices 0, 4, 7 and 11 in a DL subframe when two CRS ports are configured. Moreover, the CRS in LTE cannot be disabled, and thus its corresponding time interval will not be empty even if there is no LTE traffic. As a result, it may be challenging for the NR transmission to avoid collision with the LTE CRS.

For the downlink payload data (e.g., the Physical Downlink Shared Channel (PDSCH)), the NR transmission can be dynamically scheduled to avoid collision with the LTE CRS. However, it may be difficult to dynamically schedule the NR downlink system signals (e.g., cell-specific signals, such as Synchronization Signal Block (SSB), which includes synchronization signals and physical broadcast channel (PBCH)) because such signals are transmitted periodically and may have fixed positions in the subframe. Furthermore, the SSB is usually transmitted in the cell search stage, during which the channel between the gNB and the UE has not been established yet and thus the dynamical scheduling of NR is not possible.

Therefore, it may be desirable to find a way to enable the transmission of downlink system signals in the case that different RATs operate in the same frequency band or in at least partially overlapped frequency bands.

FIG. 2 is a flowchart illustrating a method 200 according to an embodiment of the present disclosure. The method 200 can be performed at a network device, e.g., the network device 120 of the second RAT.

At block 210, a first time period corresponding to a subframe in a frame of a first RAT is determined. The first RAT may operate in time division duplex (TDD) mode and a first frequency band, and the subframe may comprise a guard period (GP) used for switching between downlink and uplink in the frame of the first RAT. More details about the frame of the first RAT are described below with respect to FIG. 3.

FIG. 3 shows an exemplary frame structure of the first RAT operating in TDD mode. A frame 310 of the first RAT includes a plurality of subframes, in which a subframe 320 corresponds to a first time period 325 and includes a GP 330. The frame 310, subframe 320, first time period 325 and GP 330 in FIG. 3 can be examples of the frame, the subframe, the first time period and the GP as described with respect to block 210. As shown in FIG. 3, the GP 330 is configured for switching between downlink and uplink transmissions in the frame 310. No transmission of the first RAT occurs in the GP 330, which can help avoid interference between the downlink transmission and the uplink transmission in the frame 310.

It should be noted that, although only one GP 330 is shown in FIG. 3, there can be other GPs in the other subframes of the frame 310. Moreover, although the GP 330 is shown in FIG. 3 as switching from downlink to uplink, it can also be used to switch from uplink to downlink. It should also be noted that, although the frame 310 is illustrated only in time domain, it is also possible that the frame 310 correspond to a time interval and a plurality of subcarriers in frequency domain, such as the orthogonal frequency-division multiplexing (OFDM) scheme.

Turn back to FIG. 2. At block 220, a downlink system signal of a second RAT is transmitted in the first time period. For example, as shown in FIG. 3, the downlink system signal 340 of the second RAT can be transmitted in the first time period 325. Examples of the downlink system signal 340 may include cell-specific signals, such as synchronization signals, broadcasted system information, cell reference signals, or the like. The second RAT may operate in a second frequency band that at least partially overlaps with the first frequency band. For example, the second frequency band may be the same as the first frequency band, cover the first frequency band, fall within the first frequency band, or partially overlap with the first frequency band.

As an example, the frame 310 of the first RAT may be transmitted at the network device 110, and the downlink system signal 340 of the second RAT may be transmitted at the network device 120. Whether the network devices 110 and 120 are implemented in separate physical devices or in the same physical device, their operations can be coordinated, e.g., by a higher-layer control entity.

Due to the existence of the GP 330 in the subframe 320, the system signals (e.g., the CRS of LTE) of the first RAT in the subframe 320 may be not as dense as the other subframes without GPs, making it possible for the second RAT to arrange the transmission of the downlink system signal 340 in the first time period 325 without collision with the first RAT.

According to an embodiment, the downlink system signal 340 occupies a second time period 345 that is not configured or not intended to transmit system signals (e.g., cell-specific signals, such as CRS) according to the first RAT. The second time period 345 may be at least part of the first time period 325. For example, the first RAT is LTE, and the second time period 345 (e.g., OFDM symbol positions) can be selected from the symbol positions that are not occupied by the LTE CRS in the subframe 320.

In the case that the second time period is selected to avoid the system signals of the first RAT, it is possible to make the frames of the first RAT be time aligned with the frames of the second RAT without the risk of collision, which can avoid the negative effects caused by the frame shift (e.g., complicated signaling interaction between the nodes of the two RATs).

According to an embodiment, it is preferable to provide one or more empty symbols between the downlink system signal 340 and subsequent signals in the frame 310. Here, the empty symbols mean that there is no transmission during a time period corresponding to the empty symbols. For example, the symbol 350 in FIG. 3 can remain empty without any transmission, which can help avoid interference between the downlink system signal 340 and the subsequent uplink signals of the first RAT. The interference may be caused by the propagation delay in the channel. Usually, more empty symbols are required for a larger cell size because it has a longer propagation delay. Therefore, the number of the empty symbols 350 may depend on the size of the cell (e.g., the cell 110) of the first RAT. Alternatively, at least two empty symbols 350 can be provided between the downlink system signal 340 and subsequent signals in the frame 310, which can avoid the interference for typical cell deployments.

According to an embodiment, the downlink system signal 340 may include synchronization signals of the second RAT. The synchronization signals are usually transmitted from the network device to the terminal device for the cell search and downlink synchronization. The downlink system signal 340 may further include minimum system information (e.g., the Master Information Block (MIB)) of the second RAT to help the downlink synchronization process. For example, in the case that the second RAT is NR, the downlink system signal may be the SSB, which includes synchronization signals and physical broadcast channel (PBCH) carrying MIB.

According to an embodiment, in addition to the GP 330, the subframe 320 may further include two portions, a first portion 360 and a second portion 370, as shown in FIG. 3.

The GP 330 may be positioned between the first portion 360 and the second portion 370, but other configurations are also possible. According to the configuration of the subframe 320, the first portion 360 may be a portion configured to transmit downlink signals of the first RAT and/or the second portion 370 may be a portion configured to transmit uplink signals of the first RAT. However, in an embodiment of the present disclosure, at least part of the time periods corresponding to the first portion 360 and/or the second portion 370 can be used to transmit the downlink system signal 340 of the second RAT. More generally, the downlink system signal 340 can be transmitted in at least one of a fourth time period 335 corresponding to the GP 330, a fifth time period 365 corresponding to the first portion 360 or a sixth time period 375 corresponding to the second portion 370. The time period(s) to transmit the downlink system signal 340 may be selected in consideration of various factors, such as the symbol positions of the downlink system signal 340, the cell size, the overhead in the subframe 320, and so on. Examples with more details will be illustrated below in connection with FIGS. 5-11.

According to an embodiment, at least part of the downlink system signal 340 is transmitted in the fourth time period 335. As there is no transmission of the first RAT in the GP 330, the impact on the first RAT can be reduced.

According to an embodiment, the fifth time period 365 can be used to transmit both downlink signals of the first RAT and the downlink system signal 340. In this way, both the transmission of the downlink system signal 340 and the overhead in the subframe 320 are considered to get a desired result. More details will be described in connection with FIG. 11.

Figure 4:
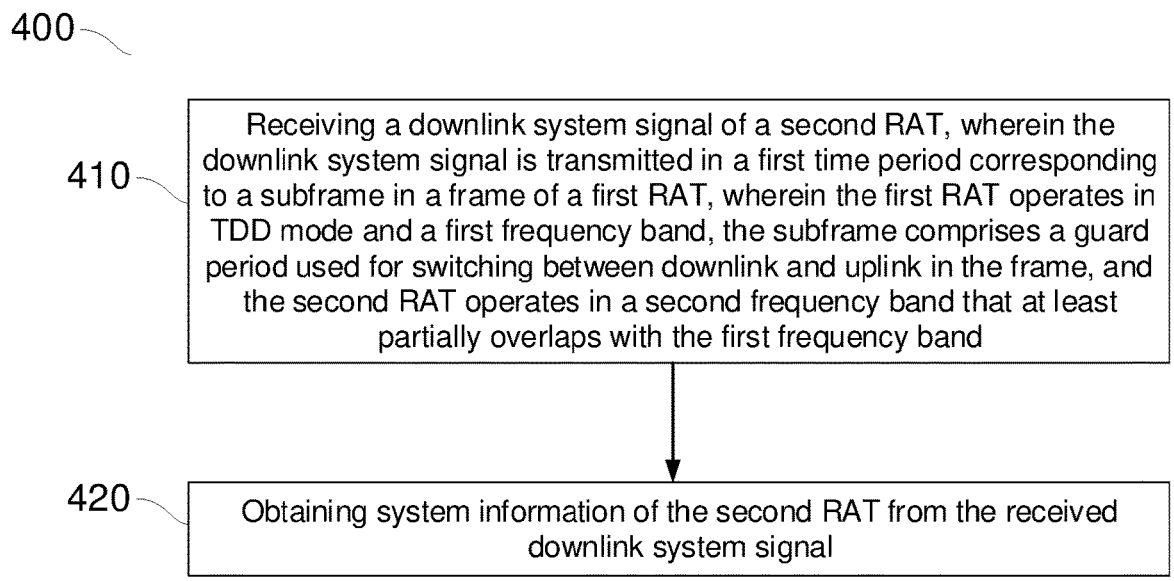
FIG. 4 is a flowchart illustrating a method at the terminal device according to embodiments of the present disclosure.

FIG. 4 is a flowchart illustrating a method 400 according to an embodiment of the present disclosure. The method 400 can be performed at a terminal device, e.g., the terminal device 140 of the second RAT, to receive the downlink system signal (e.g., the downlink system signal 340) transmitted according to the method 200.

At block 410, a downlink system signal (e.g., the downlink system signal 340) of a second RAT is received. The downlink system signal may be transmitted in a first time period (e.g., the first time period 325) corresponding to a subframe (e.g., the subframe 320) in a frame (e.g., the frame 310) of a first RAT. The first RAT may operate in TDD mode and a first frequency band, and the subframe may comprise a GP (e.g., the GP 330) used for switching between downlink and uplink in the frame. The second RAT may operate in a second frequency band that at least partially overlaps with the first frequency band.

At block 420, system information of the second RAT is obtained from the received downlink system signal. For example, the terminal device 140 may decode the received downlink system signal 340 to obtain the system information (e.g., MIB) of the second RAT.

More details of the method 400 are similar to those described with respect to FIGS. 2-3 and thus are omitted here.

Some specific examples will be described in connection with FIGS. 5-11 to illustrate the methods according to the present disclosure.

According to an embodiment, the first RAT may be LTE and/or the second RAT may be NR. In the following, descriptions will be made by taking LTE as the first RAT and NR as the second RAT as an example, although it would be appreciated that these descriptions and/or the equivalents thereof may apply to other RATs. In addition, in the following, the SSB of NR will be described as an example of the downlink system signal, but it would be appreciated that other downlink system signals such as Channel State Information Reference Signal (CSI-RS) or Tracking Reference Signal (TRS) can also be transmitted in a similar way.

Figure 5:
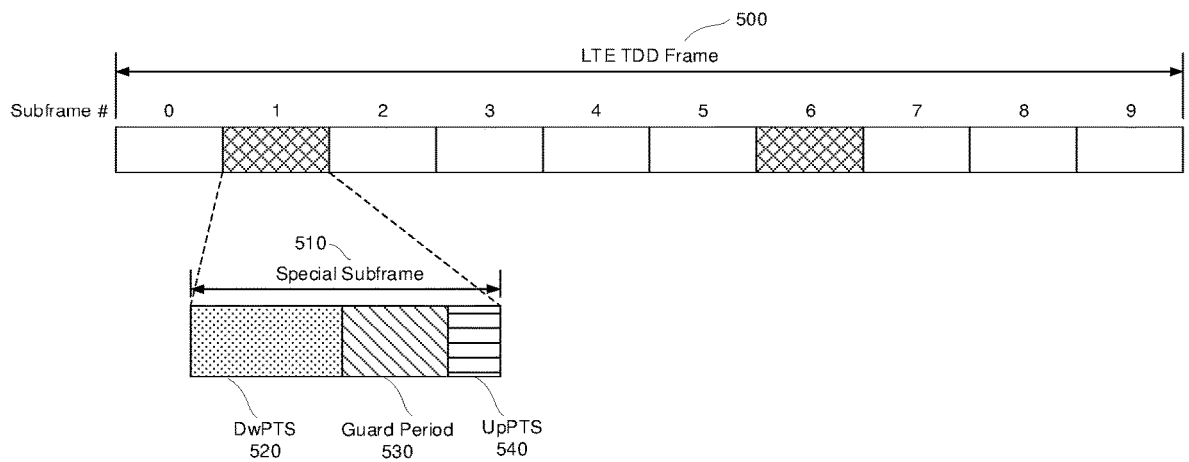
FIG. 5 is a schematic diagram illustrating an exemplary frame structure of an LTE TDD frame according to embodiments of the present disclosure.

FIG. 5 is a schematic diagram illustrating an exemplary frame structure of an LTE TDD frame 500 according to embodiments of the present disclosure. The LTE TDD frame 500 may be an example of the frame 300 of FIG. 3.

As shown in FIG. 5, the LTE TDD frame 500 may include 10 subframes, i.e., Subframe 0 to Subframe 9. Usually, Subframe 1 is the special subframes of LTE TDD and Subframe 6 can also be the special subframe in some cases, both of which are examples of the subframe 320. The special subframe 510 includes a downlink pilot time slot (DwPTS) 520, a guard period (GP) 530 and an uplink pilot time slot (UpPTS) 540, which can be examples of the first portion 360, the GP 330 and the second portion 370 of FIG. 3, respectively. The GP 530 is used for switching from downlink to uplink in the frame 500. In LTE TDD, the DwPTS 520 can be configured to carry CRS, and in some cases can be further configured to carry control information (e.g., Physical Downlink Control Channel (PDCCH)) and data (e.g., PDCCH). The UpPTS 540 can be configured to carry Sounding Reference Signals (SRS) and/or Physical Uplink Control Channel (PUCCH), but the eNB can also decide whether UE shall transmit or not in the UpPTS. The GP 530, similar to the GP 330, can be used for switching between the downlink and uplink transmission and is left empty without LTE transmission.

Figure 6:
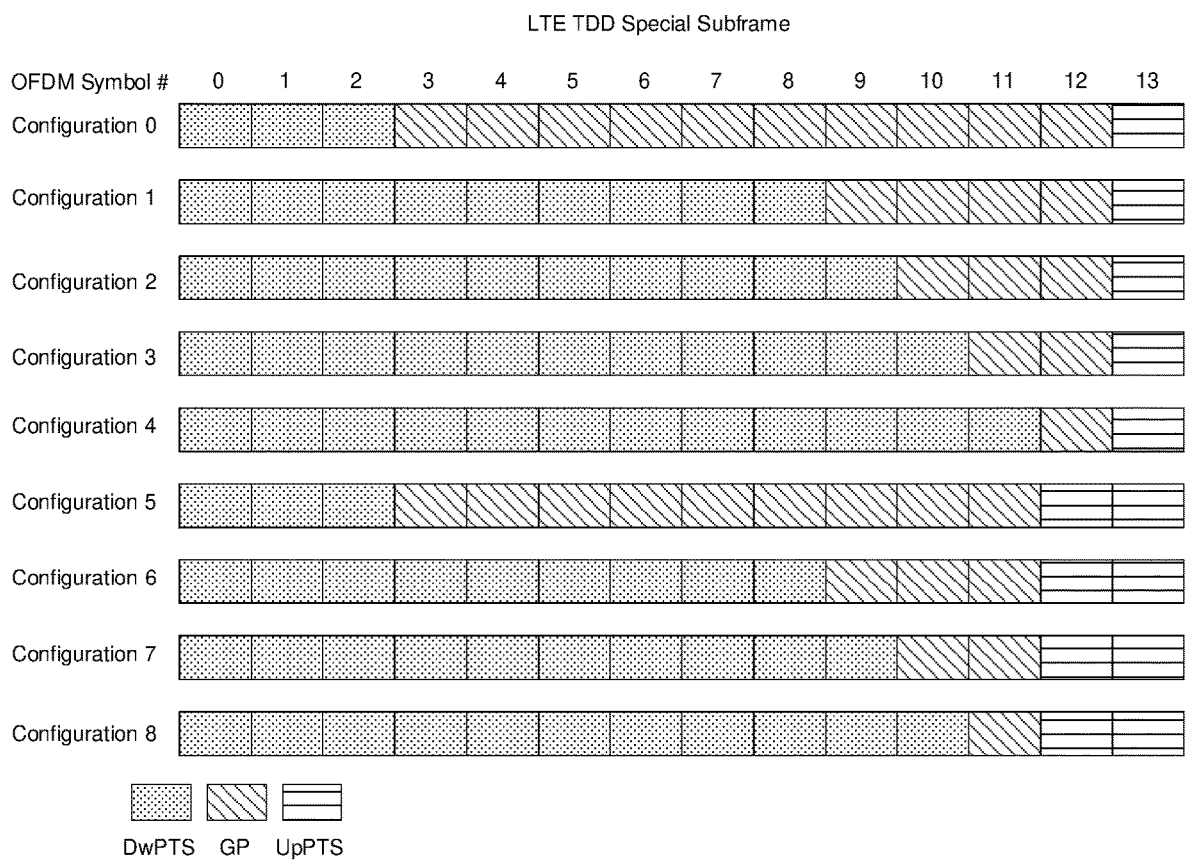
FIG. 6 is a schematic diagram illustrating exemplary configurations of the LTE TDD special subframe according to embodiments of the present disclosure.

The DwPTS 520, the GP 530 and the UpPTS 540 have configurable lengths while the total length of the special subframe is fixed, usually 14 OFDM symbols or 1 ms. In LTE TDD, there are 9 configurations for the special subframe, each having different numbers of OFDM symbols for DwPTS, GP and UpPTS. FIG. 6 shows the 9 special subframe configurations. As shown in FIG. 6, there are 14 OFDM symbols in the special subframe, and each configuration has different numbers of OFDM symbols for DwPTS, GP and UpPTS. Each configuration has either 1 or 2 symbols for UpPTS, and Configuration 0 has the longest GP of 10 symbols. Usually, a longer GP can support a larger cell size but the overhead of LTE is also larger because there is no LTE transmission in the GP.

Figure 7:
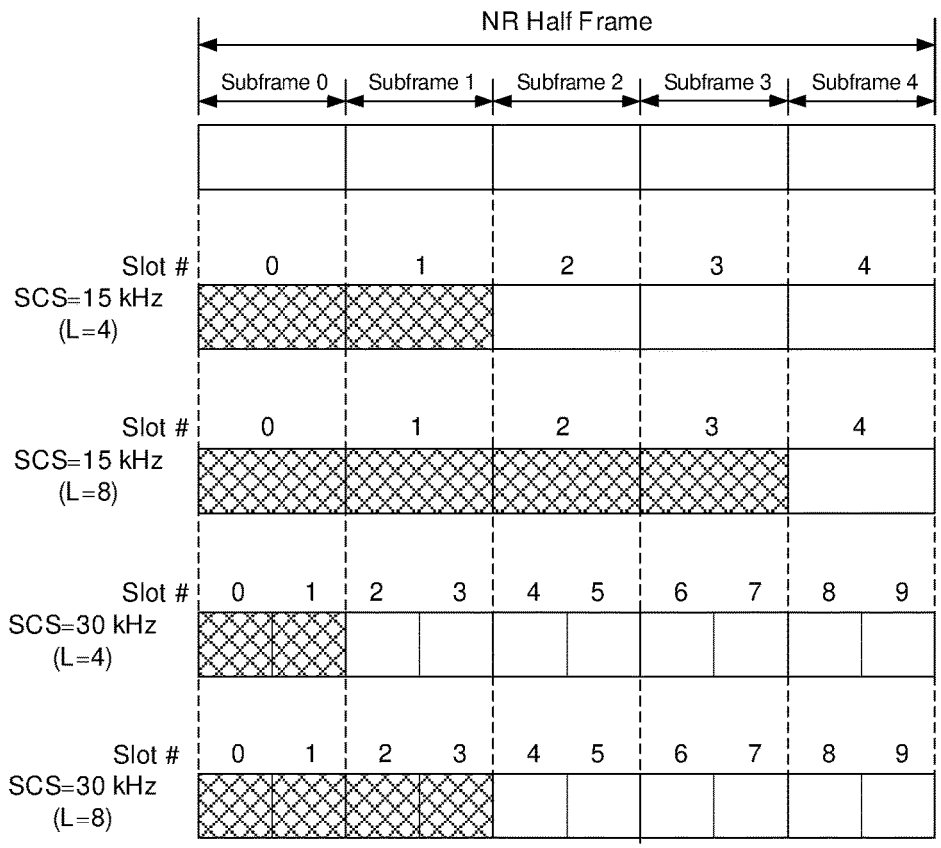
FIG. 7 is a schematic diagram illustrating exemplary slot configurations of NR SSB according to embodiments of the present disclosure.

FIG. 7 is a schematic diagram illustrating exemplary slot configurations of NR SSB according to embodiments of the present disclosure.

The NR frame has the same duration as the LTE frame, i.e., 10 ms, and also includes 10 subframes as the LTE frame. FIG. 7 shows a half frame including 5 subframes for illustration because the NR SSB is transmitted in a half frame during an SSB transmission period. NR supports different subcarrier spacings (SCS) and the slot length depends on the SCS. For the SCS of 15 kHz or 30 kHz, which is usually used for the lower frequencies of NR, the corresponding slot length is equal to the subframe length or half of the subframe length, respectively, as shown in FIG. 7. In other words, for the SCS of 15 kHz, a half frame has 5 slots, while for the SCS of 30 kHz, a half frame has 10 slots.

FIG. 7 shows four examples of the slot configuration of NR SSB in different cases. For the case where SCS=15 kHz and the number of beams L=4, the NR SSB can be positioned in Slot 0 and/or Slot 1. For the case where SCS=15 kHz and L=8, the NR SSB can be positioned in one or more of Slot 0-Slot 3. For the case where SCS=30 kHz and L=4, the NR SSB can be positioned in Slot 0 and/or Slot 1. For the case where SCS=30 kHz and L=8, the NR SSB can be positioned in one or more of Slot 0-Slot 3.

Comparing the NR half frame in FIG. 7 with the LTE frame in FIG. 5, it can be found that it may be preferable to position the NR SSB in the second subframe, i.e., Subframe 1, of the NR half frame, such that the NR SSB can be transmitted in a time period corresponding to the LTE special subframe (i.e., Subframe 1 and/or Subframe 6 in the LTE TDD frame 500). In this way, no time shift is required between the LTE frame and the NR frame and thus the signaling interaction between LTE eNB and NR gNB can be simplified. Among the examples shown in FIG. 7, it is possible to transmit the NR SSB in the LTE special subframe without frame timing shift for the case SCS=15 kHz and L=4, SCS=15 kHz and L=8, and SCS=30 kHz and L=8. It should be noted that these cases are only examples but not limitation.

Figure 8:
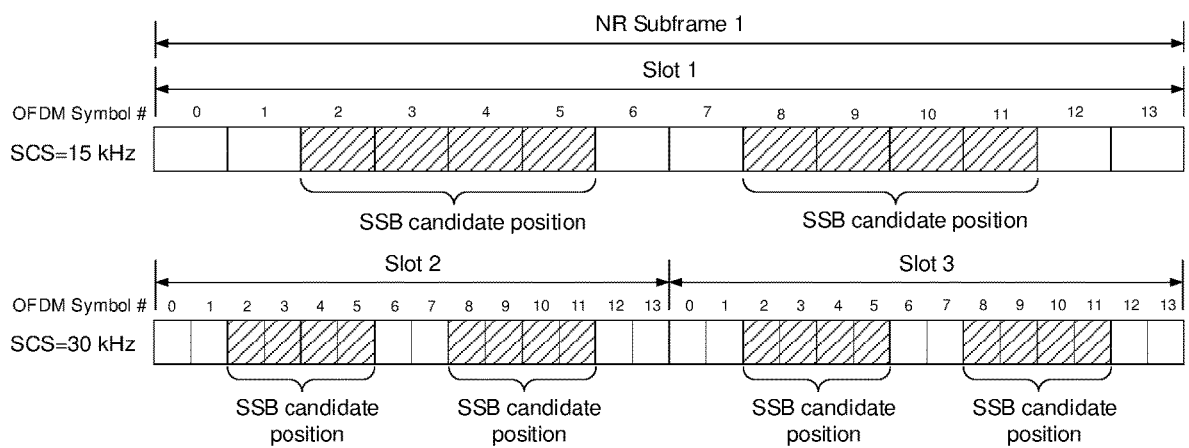
FIG. 8 is a schematic diagram illustrating exemplary SSB candidate positions in a NR subframe according to embodiments of the present disclosure.

FIG. 8 is a schematic diagram illustrating exemplary SSB candidate positions in a NR subframe according to embodiments of the present disclosure. In FIG. 8, NR Subframe 1 is used as an example. Usually, a NR SSB is a group of 4 NR OFDM symbols in time and 240 subcarriers in frequency, although the frequency domain is not shown in FIG. 8. Similar to LTE, each NR slot may have 14 OFDM symbols in time, although the slot length of NR may be varied as described in connection with FIG. 7. Hence the OFDM symbol length for the 30 kHz SCS is half of the OFDM symbol length for the 15 kHz SCS, as shown in FIG. 8.

The OFDM symbols in a NR slot that are allowed for SSB transmission (i.e., the candidate SSB position) for SCS of 15 kHz and 30 kHz are usually fixed. In this example, the candidate SSB positions are Symbols 2-5 and Symbol 8-11 in each slot.

As shown in FIG. 8, for the case where SCS=15 kHz and thus Slot 1 corresponds to Subframe 1 of NR, there are two SSB candidate positions, i.e., Symbols 2-5 and Symbols 8-11. For the case where SCS=30 kHz and thus Slots 2 and 3 correspond to Subframe 1 of NR, there are four SSB candidate positions, i.e., Symbols 2-5 and Symbols 8-11 in Slot 2 and Symbols 2-5 and Symbols 8-11 in Slot 3. The NR SSB can occupy one or more of the candidate positions as desired.

Considering the LTE TDD special subframe configurations in FIG. 6 and the NR candidate SSB positions in FIG. 8, there are some possible configurations in which the time period corresponding to the LTE TDD special subframe can be used to transmit NR SSB without collisions.

According to an embodiment, the NR SSB can be transmitted only in the time period corresponding to the GP (an example of the fourth time period 335).

Table 1 below illustrates the possible LTE TDD special subframe configurations for NR SSB transmissions in this embodiment. In particular, Table 1 lists, for each LTE TDD special subframe configuration as shown in FIG. 6, whether each NR SSB position candidate as shown in FIG. 8 is possible to transmit NR SSB.

TABLE 1

| LTE Special subframe configuration | NR SSB 15 kHz | | NR SSB 30 kHz | | | |
|---|---|---|---|---|---|---|
| | SSB in slot 1 | | SSB in slot 2 | | SSB in slot 3 | |
| | Symbols 2-5 | Symbols 8-11 | Symbols 2-5 | Symbols 8-11 | Symbols 2-5 | Symbols 8-11 |
| 0 | Not OK | OK | Not OK | OK | OK | OK |
| 1 | Not OK | Not OK | Not OK | Not OK | Not OK | OK |
| 2 | Not OK | Not OK | Not OK | Not OK | Not OK | OK |
| 3 | Not OK | Not OK | Not OK | Not OK | Not OK | OK |
| 4 | Not OK | Not OK | Not OK | Not OK | Not OK | Not OK |
| 5 | Not OK | OK | Not OK | OK | OK | Not OK |
| 6 | Not OK | Not OK | Not OK | Not OK | Not OK | Not OK |
| 7 | Not OK | Not OK | Not OK | Not OK | Not OK | Not OK |
| 8 | Not OK | Not OK | Not OK | Not OK | Not OK | Not OK |

As shown in Table 1, for the case where SCS=15 kHz, LTE TDD special subframe Configuration 0 and Configuration 5 are suitable for NR SSB transmission, where the NR SSB can occupy the time period corresponding to Symbols 8-11 of the LTE TDD special subframe. Since Symbols 8-11 of the LTE TDD special subframe is part of the GP in Configurations 0 and 5, there is no impact on the LTE eNB downlink scheduling. The UpPTS can be either used for LTE uplink transmission or left empty, depending on how many empty symbols between the end of NR SSB transmission and the start of LTE uplink transmission are required for the specific deployment (e.g. the cell size). The empty symbols here can also be called as the effective GP.

For the case where SCS=30 kHz, LTE TDD special subframe Configurations 0-3 and 5 are suitable for NR SSB transmission. More specifically, the SSB candidate positions for SCS=30 kHz correspond to LTE symbols 1-2, 4-5, 8-9 and 11-12, as shown in FIG. 8. In Configurations 0-3 and 5, at least one of the candidate positions falls within the GP and thus can be used to transmit the NR SSB. The UpPTS can be either used for LTE uplink transmission or left empty, depending on the effective GP required for the specific deployment. When the overhead of LTE is an issue, Configurations 0-3 may be preferable because the DwPTS in these configurations is longer and thus more LTE downlink data can be transmitted. Moreover, in Configurations 0-3, as the NR SSB position corresponds to LTE Symbols 11-12, it is preferable to leave the UpPTS empty without LTE uplink transmission in order to ensure the effective GP, and such configurations may be more suitable for a smaller cell size because there would be only one empty symbol (i.e., the empty UpPTS) between the NR SSB and the subsequent uplink transmissions.

Figure 9:
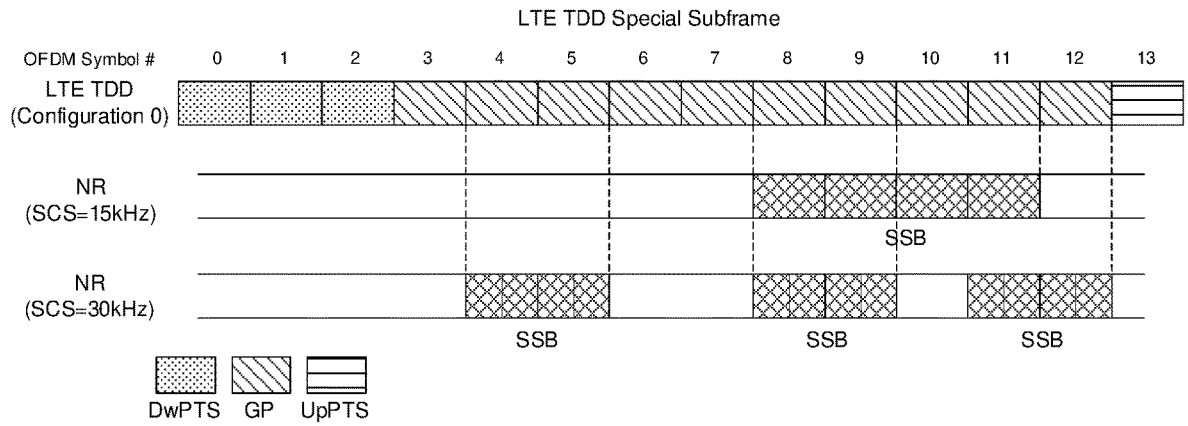
FIG. 9 is a schematic diagram illustrating an example of utilizing Configuration 0 of LTE TDD special subframe to transmit NR SSB according to embodiments of the present disclosure.

Refer to FIG. 9 for an example of using the GP to transmit NR SSB in Configuration 0 of LTE TDD special subframe. As shown in FIG. 9, for SCS=15 kHz, the NR SSB can occupy the time period corresponding to Symbols 8-11 of the LTE TDD special subframe, and for SCS=30 kHz, the NR SSB can occupy the time period corresponding to Symbols 4-5, Symbols 8-9 and/or Symbols 11-12 of the LTE TDD special subframe.

It should be noted that, in the case where the time period corresponding to the UpPTS is used for NR SSB transmission instead of LTE uplink transmission, it is also possible for LTE TDD special subframe Configurations 6-8 to transmit the NR SSB, where the NR SSB can occupy the time period corresponding to LTE symbols 11-12.

According to another embodiment, the NR SSB can be transmitted in the time period corresponding to the GP and the time period corresponding to the DwPTS. In this embodiment, the LTE eNB may not schedule PDSCH in the DwPTS and thus the overhead may be large. However, it provides more flexibility for the LTE TDD special subframe configuration because most of the special subframe configurations are possible for the NR SSB transmission. For example, if two CRS ports are configured, the CRS may occupy symbols with indices 0, 4, 7 and 11 in the DwPTS of the LTE TDD special subframe, and the other symbols in the DwPTS are available for the NR SSB transmission.

Table 2 below illustrates the possible LTE TDD special subframe configurations for NR SSB transmissions in this embodiment with two CRS ports. In particular, Table 2 lists, for each LTE TDD special subframe configuration as shown in FIG. 6, whether each NR SSB position candidate as shown in FIG. 8 is possible to transmit NR SSB.

TABLE 2

| LTE Special subframe configuration | NR SSB 15 kHz | | NR SSB 30 kHz | | | |
|---|---|---|---|---|---|---|
| | SSB in slot 1 | | SSB in slot 2 | | SSB in slot 3 | |
| | Symbols 2-5 | Symbols 8-11 | Symbols 2-5 | Symbols 8-11 | Symbols 2-5 | Symbols 8-11 |
| 0 | OK | OK | OK | OK | OK | OK |
| 1 | Not OK | OK | OK | Not OK | OK | OK |
| 2 | Not OK | OK | OK | Not OK | OK | OK |
| 3 | Not OK | OK | OK | Not OK | OK | OK |
| 4 | Not OK | Not OK | OK | Not OK | OK | Not OK |

TABLE 2-continued

| LTE Special subframe configuration | NR SSB 15 kHz | | NR SSB 30 kHz | | | |
| --- | --- | --- | --- | --- | --- | --- |
| | SSB in slot 1 | | SSB in slot 2 | | SSB in slot 3 | |
| | Symbols 2-5 | Symbols 8-11 | Symbols 2-5 | Symbols 8-11 | Symbols 2-5 | Symbols 8-11 |
| 5 | OK | OK | OK | OK | OK | OK |
| 6 | Not OK | OK | OK | Not OK | OK | OK |
| 7 | Not OK | OK | OK | Not OK | OK | OK |
| 8 | Not OK | OK | OK | Not OK | OK | OK |

As shown in Table 2, for the case where SCS=15 kHz, all of the LTE TDD special subframe configurations except for Configuration 4 are suitable for NR SSB transmission. For the case where SCS=30 kHz, all of the LTE TDD special subframe configurations are suitable for NR SSB transmission.

Figure 10:
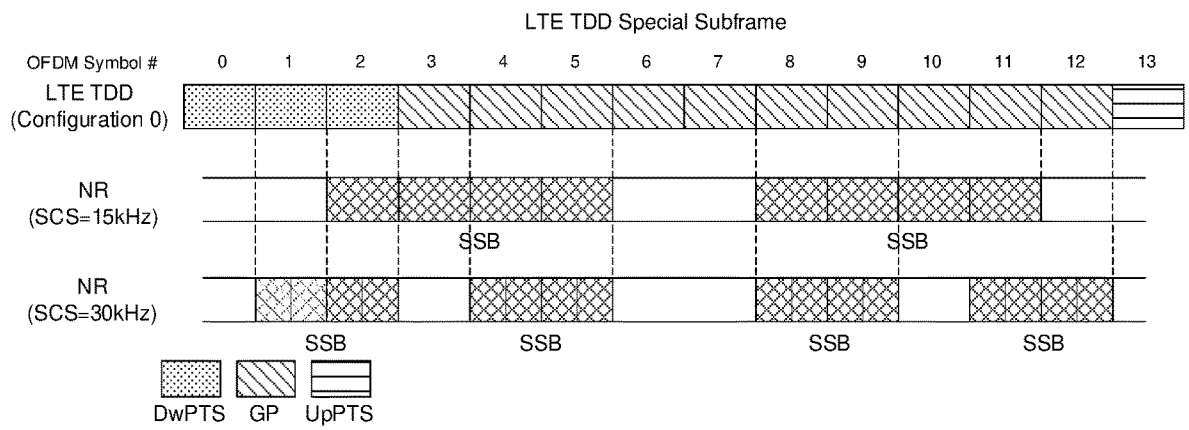
FIG. 10 is a schematic diagram illustrating another example of utilizing Configuration 0 of LTE TDD special subframe to transmit NR SSB according to embodiments of the present disclosure.

Refer to FIG. 10 for an example of utilizing the GP and the DwPTS to transmit NR SSB in Configuration 0 of LTE TDD special subframe. Assume that two CRS ports and one symbol LTE PDCCH are configured in this example. As shown in FIG. 10, for SCS=15 kHz, the NR SSB can occupy the time period corresponding to Symbols 2-5 and/or Symbols 8-11 of the LTE TDD special subframe, and for SCS=30 kHz, the NR SSB can occupy the time period corresponding to Symbols 1-2, Symbols 4-5, Symbols 8-9 and/or Symbols 11-12 of the LTE TDD special subframe.

According to a further embodiment, the time period corresponding to the DwPTS can be used to transmit both the downlink system signal and downlink LTE signals. In this embodiment, the NR SSB transmission occupies part of the DwPTS while the LTE eNB may schedule PDSCH in the remaining part of the DwPTS. Since part of the DwPTS can be used together with the GP to transmit NR SSB, more SSB candidate positions may be available, providing flexibility to NR SSB transmission. In the meanwhile, since the remaining part of the DwPTS is used for LTE downlink transmission, the overhead of LTE can be reduced.

Figure 11:
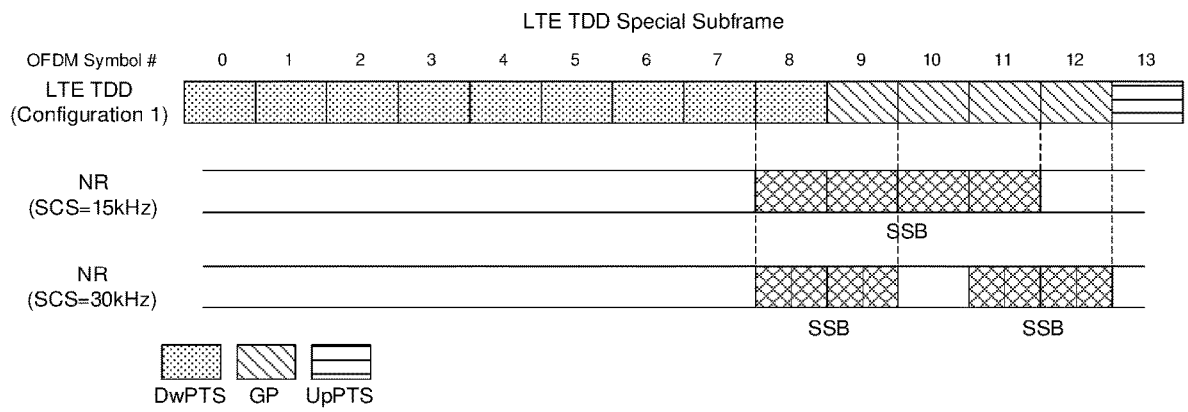
FIG. 11 is a schematic diagram illustrating an example of utilizing Configuration 1 of LTE TDD special subframe to transmit NR SSB according to embodiments of the present disclosure.

FIG. 11 illustrates LTE TDD subframe Configuration 1 as an example of this embodiment. As shown in FIG. 11, the last one symbol in the DwPTS, i.e., LTE Symbol 8, is used for NR SSB transmission, while the remaining symbols in the DwPTS can be used for the LTE downlink transmission. In this way, for SCS=15 kHz, the NR SSB can occupy the time period corresponding to Symbols 8-11 of the LTE TDD special subframe, and for SCS=30 kHz, the NR SSB can occupy the time period corresponding to Symbols 8-9 and/or Symbols 11-12 of the LTE TDD special subframe. Similarly, in LTE TDD special subframe Configuration 6, LTE Symbol 8 can be used for NR SSB transmission while the remaining symbols in the DwPTS can be used for the LTE downlink transmission. As compared with the case shown in FIG. 9, the overhead can be substantially reduced while the effective GP can remain the same.

Such a configuration may have impact on LTE UE performance because part of the DwPTS is used for NR SSB transmission while the LTE UE is unaware of it. The entirety of DwPTS will be received and processed by the LTE UE, although part of the DwPTS actually carries the NR SSB. Nevertheless, with the help of other techniques, e.g., HARD retransmission, it may still be possible for the LTE UE to correctly decode the downlink data (e.g., PDSCH).

Figure 12A:
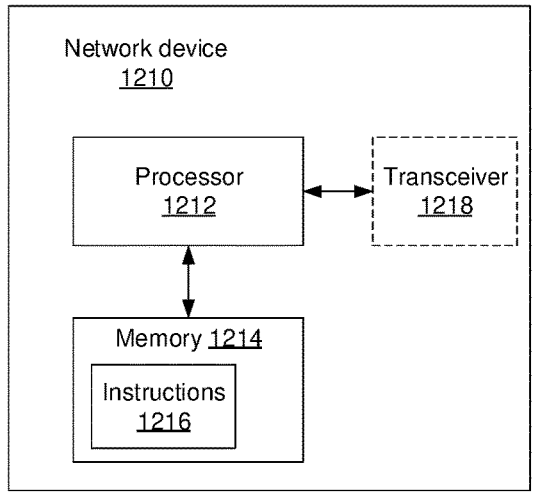
FIG. 12A is a block diagram illustrating an exemplary network device according to embodiments of the present disclosure.

FIG. 12A is a block diagram of a network device 1210 according to embodiments of the present disclosure, which can be e.g., the network device 120 as described in connection with FIG. 1.

The network device 1210 includes a processor 1212 and a memory 1214. Optionally, the network device 1210 may further include a transceiver 1218 coupled to the processor 1212. The memory 1214 contains instructions 1216 executable by the processor 1212 to cause the network device 1210 to perform the actions of the method 200. Particularly, the memory 1214 may contain instructions that, when executed by the processor 1212, cause the network device 1210 to determine a first time period corresponding to a subframe in a frame of a first RAT and transmit a downlink system signal of a second RAT in the first time period. The first RAT may operate in TDD mode and a first frequency band, and the second RAT may operate in a second frequency band that at least partially overlaps with the first frequency band. The subframe may comprise a guard period (GP) used for switching between downlink and uplink in the frame of the first RAT.

According to an embodiment, the downlink system signal may occupy a second time period that is not configured to transmit system signals according to the first RAT.

According to an embodiment, frames of the first RAT may be time aligned with frames of the second RAT.

According to an embodiment, one or more empty symbols may be positioned between the downlink system signal and subsequent signals in the frame of the first RAT. No transmission occurs during a third time period corresponding to the one or more empty symbols.

According to an embodiment, the one or more empty symbols may comprise at least two empty symbols, or the number of the one or more empty symbols may depend on a size of a cell of the first RAT.

According to an embodiment, the downlink system signal may comprise synchronization signals of the second RAT.

According to an embodiment, the subframe may further comprise a first portion and a second portion.

According to an embodiment, the GP may be positioned between the first portion and the second portion.

According to an embodiment, according to the first RAT, the first portion may be configured to transmit downlink signals, and/or the second portion may be configured to transmit uplink signals.

According to an embodiment, the downlink system signa may be transmitted in at least one of a fourth time period corresponding to the GP, a fifth time period corresponding to the first portion of the subframe or a sixth time period corresponding to the second portion of the subframe.

According to an embodiment, at least part of the downlink system signal may be transmitted in the fourth time period.

According to an embodiment, the fifth time period may be used to transmit both downlink signals of the first RAT and the downlink system signal.

According to an embodiment, the first RAT may be LTE, and/or the second RAT may be NR.

According to an embodiment, the subframe may be a special subframe of LTE TDD, the first portion of the subframe may be a DwPTS and the second portion of the subframe may be a UpPTS.

According to an embodiment, the special subframe of LTE TDD may use one of Configuration 0, Configuration 1, Configuration 2, Configuration 3 or Configuration 5, and the downlink system signal may be transmitted in the fourth time period.

According to an embodiment, the downlink system signal may be transmitted in the fourth time period and the fifth time period.

According to an embodiment, the special subframe of LTE TDD may use Configuration 1 or Configuration 6, and the fifth time period may be used to transmit both the downlink system signal and downlink LTE signals.

According to an embodiment, the downlink system signal may comprise at least one of SSB, CSI-RS or TRS.

It should be noted that, more details described with reference to FIG. 3 and FIGS. 5-11 also apply here and may be omitted.

Figure 12B:
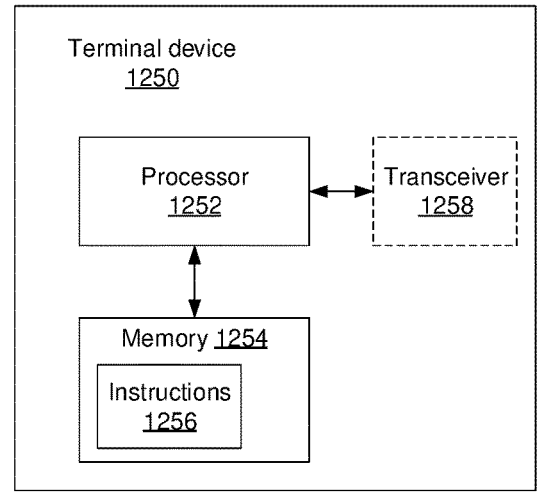
FIG. 12B is a block diagram illustrating an exemplary terminal device according to embodiments of the present disclosure.

FIG. 12B is a block diagram of a terminal device 1250 according to embodiments of the present disclosure, which can be e.g., the network device 110 as described in connection with FIG. 1.

The terminal device 1250 includes a processor 1252 and a memory 1254. Optionally, the terminal device 1250 may further include a transceiver 1258 coupled to the processor 1252. The memory 1254 contains instructions 1256 executable by the processor 1252 to cause the terminal device 1250 to perform the actions of the method 400. Particularly, the memory 1254 may contain instructions that, when executed by the processor 1252, cause the terminal device 1250 to receive a downlink system signal of a second RAT and obtain system information of the second RAT from the received downlink system signal. The downlink system signal may be transmitted in a first time period corresponding to a subframe in a frame of a first RAT. The first RAT may operate in TDD mode and a first frequency band, and the second RAT may operate in a second frequency band that at least partially overlaps with the first frequency band. The subframe may comprise a guard period used for switching between downlink and uplink in the frame.

Further details about the terminal device 1250 are similar to those described with respect to the network device 1210 and thus are omitted here. It should also be noted that, the details described with reference to FIG. 3 and FIGS. 5-11 also apply here and may be omitted.

The memories 1214 and 1254 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 1212 and 1252 may be of any type suitable to the local technical environment, and may include one or more of general purpose processors, special purpose processors (e.g., Application Specific Integrated Circuit (ASICs)), microprocessors, digital signal processors (DSPs) and processors based on multicore processor architecture, as non-limiting examples.

Figure 13A:
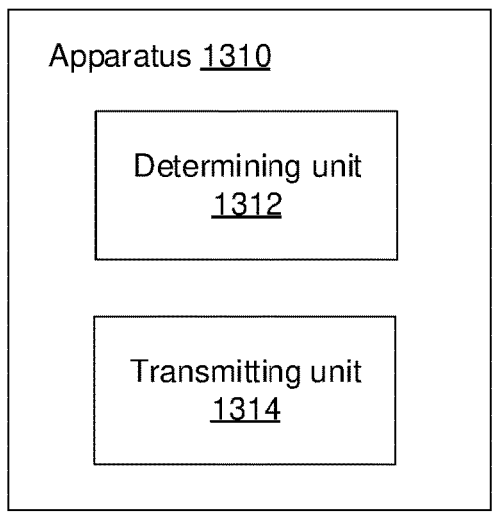
FIG. 13A is a block diagram illustrating an exemplary apparatus that can perform the method of FIG. 2 according to embodiments of the present disclosure.

FIG. 13A is a block diagram of an apparatus 1310 according to embodiments of the present disclosure, which can be configured to perform the method 200 as described in connection with FIG. 2.

The apparatus 1310 may include a determining unit 1312 and a transmitting unit 1314. The determining unit 1312 may be configured to determine a first time period corresponding to a subframe in a frame of a first RAT, and the transmitting unit 1314 may be configured to transmit a downlink system signal of a second RAT in the first time period. The first RAT may operate in TDD mode and a first frequency band, and the second RAT may operate in a second frequency band that at least partially overlaps with the first frequency band. The subframe may comprise a guard period (GP) used for switching between downlink and uplink in the frame of the first RAT.

The apparatus 1310 can be implemented as the network device 120 or as a software and/or a physical device within the network device 120 or communicatively coupled to the network device 120.

Further details about the apparatus 1310 are similar to those described with respect to FIGS. 2-3 and FIGS. 5-11 and are omitted here.

Figure 13B:
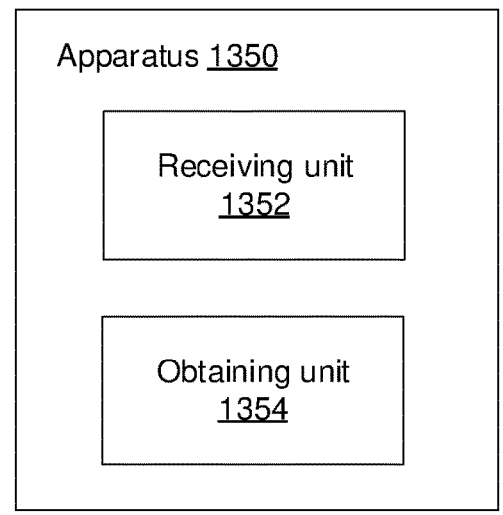
FIG. 13B is a block diagram illustrating an exemplary apparatus that can perform the method of FIG. 4 according to embodiments of the present disclosure.

FIG. 13B is a block diagram of an apparatus 1350 according to embodiments of the present disclosure, which can be configured to perform the method 400 as described in connection with FIG. 4.

The apparatus 1350 may include a receiving unit 1352 and an obtaining unit 1354. The receiving unit 1352 may be configured to receive a downlink system signal of a second RAT and the obtaining unit 1354 may be configured to obtain system information of the second RAT from the received downlink system signal. The downlink system signal may be transmitted in a first time period corresponding to a subframe in a frame of a first RAT. The first RAT may operate in TDD mode and a first frequency band, and the second RAT may operate in a second frequency band that at least partially overlaps with the first frequency band. The subframe may comprise a guard period (GP) used for switching between downlink and uplink in the frame.

The apparatus 1350 can be implemented as the terminal device 140 or as a software and/or a physical device within the terminal device 140 or communicatively coupled to the terminal device 140.

Further details about the apparatus 1350 are similar to those described with respect to FIGS. 3-11 and are omitted here.

The units as described in FIGS. 13A and 13B may be implemented as software and/or hardware, or a device comprising the software and/or the hardware, which is not limited. For example, they can be implemented as computer readable programs that can be executed by a processor. Alternatively, they can be implemented as processing circuitry such as ASICs and/or field programmable gate arrays (FPGAs).

The present disclosure may also provide computer readable media having instructions thereon. The instructions, when executed by a processor of a network device or a terminal device, cause the network device or terminal device to perform the method according to the embodiments as described above. The computer readable media may include computer-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The computer readable media may also include computer readable transmission media (also called a carrier), for example, electrical, optical, radio, acoustical or other form of propagated signals-such as carrier waves, infrared signals, and the like.

The present disclosure may also provide computer program products including instructions. The instructions, when executed by a processor of a network device or a terminal device, cause the network device or terminal device to perform the method according to the embodiments as described above.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, units, apparatus, systems, techniques or methods described herein may be implemented in, as non-limiting examples, hardware, software, firmware, special purpose circuits or logic, general purpose hardware or controller or other computing devices, or some combination thereof.

Figure 14:
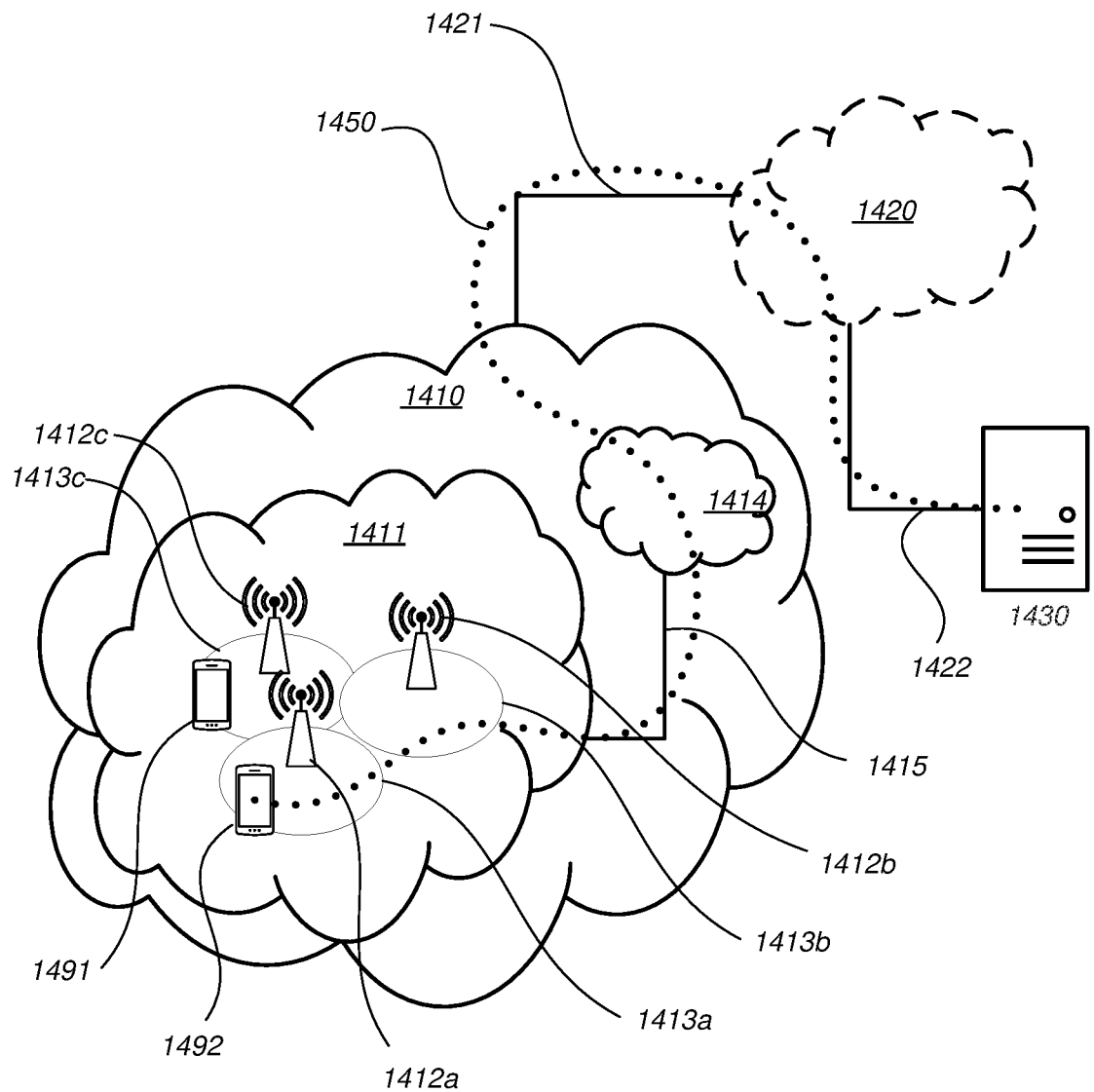
FIG. 14 schematically illustrates a telecommunication network connected via an intermediate network to a host computer.

With reference to FIG. 14, in accordance with an embodiment, a communication system includes a telecommunication network 1410, such as a 3GPP-type cellular network, which comprises an access network 1411, such as a radio access network, and a core network 1414. The access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to the core network 1414 over a wired or wireless connection 1415. A first user equipment (UE) 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

The telecommunication network 1410 is itself connected to a host computer 1430, which may be embodied in the hardware and/or software of a standalone server, a cloud-implemented server, a distributed server or as processing resources in a server farm. The host computer 1430 may be under the ownership or control of a service provider, or may be operated by the service provider or on behalf of the service provider. The connections 1421, 1422 between the telecommunication network 1410 and the host computer 1430 may extend directly from the core network 1414 to the host computer 1430 or may go via an optional intermediate network 1420. The intermediate network 1420 may be one of, or a combination of more than one of, a public, private or hosted network; the intermediate network 1420, if any, may be a backbone network or the Internet; in particular, the intermediate network 1420 may comprise two or more sub-networks (not shown).

The communication system of FIG. 14 as a whole enables connectivity between one of the connected UEs 1491, 1492 and the host computer 1430. The connectivity may be described as an over-the-top (OTT) connection 1450. The host computer 1430 and the connected UEs 1491, 1492 are configured to communicate data and/or signaling via the OTT connection 1450, using the access network 1411, the core network 1414, any intermediate network 1420 and possible further infrastructure (not shown) as intermediaries.

The OTT connection 1450 may be transparent in the sense that the participating communication devices through which the OTT connection 1450 passes are unaware of routing of uplink and downlink communications. For example, a base station 1412 may not or need not be informed about the past routing of an incoming downlink communication with data originating from a host computer 1430 to be forwarded (e.g., handed over) to a connected UE 1491. Similarly, the base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In a communication system 1500, a host computer 1510 comprises hardware 1515 including a communication interface 1516 configured to set up and maintain a wired or wireless connection with an interface of a different communication device of the communication system 1500. The host computer 1510 further comprises processing circuitry 1518, which may have storage and/or processing capabilities. In particular, the processing circuitry 1518 may comprise one or more programmable processors, application-specific integrated circuits, field programmable gate arrays or combinations of these (not shown) adapted to execute instructions. The host computer 1510 further comprises software 1511, which is stored in or accessible by the host computer 1510 and executable by the processing circuitry 1518. The software 1511 includes a host application 1512. The host application 1512 may be operable to provide a service to a remote user, such as a UE 1530 connecting via an OTT connection 1550 terminating at the UE 1530 and the host computer 1510. In providing the service to the remote user, the host application 1512 may provide user data which is transmitted using the OTT connection 1550.

The communication system 1500 further includes a base station 1520 provided in a telecommunication system and comprising hardware 1525 enabling it to communicate with the host computer 1510 and with the UE 1530. The hardware 1525 may include a communication interface 1526 for setting up and maintaining a wired or wireless connection with an interface of a different communication device of the communication system 1500, as well as a radio interface 1527 for setting up and maintaining at least a wireless connection 1570 with a UE 1530 located in a coverage area (not shown in FIG. 15) served by the base station 1520. The communication interface 1526 may be configured to facilitate a connection 1560 to the host computer 1510. The connection 1560 may be direct or it may pass through a core network (not shown in FIG. 15) of the telecommunication system and/or through one or more intermediate networks outside the telecommunication system. In the embodiment shown, the hardware 1525 of the base station 1520 further includes processing circuitry 1528, which may comprise one or more programmable processors, application-specific integrated circuits, field programmable gate arrays or combinations of these (not shown) adapted to execute instructions. The base station 1520 further has software 1521 stored internally or accessible via an external connection.

The communication system 1500 further includes the UE 1530 already referred to. Its hardware 1535 may include a radio interface 1537 configured to set up and maintain a wireless connection 1570 with a base station serving a coverage area in which the UE 1530 is currently located. The hardware 1535 of the UE 1530 further includes processing circuitry 1538, which may comprise one or more programmable processors, application-specific integrated circuits, field programmable gate arrays or combinations of these (not shown) adapted to execute instructions. The UE 1530 further comprises software 1531, which is stored in or accessible by the UE 1530 and executable by the processing circuitry 1538. The software 1531 includes a client application 1532. The client application 1532 may be operable to provide a service to a human or non-human user via the UE 1530, with the support of the host computer 1510. In the host computer 1510, an executing host application 1512 may communicate with the executing client application 1532 via the OTT connection 1550 terminating at the UE 1530 and the host computer 1510. In providing the service to the user, the client application 1532 may receive request data from the host application 1512 and provide user data in response to the request data. The OTT connection 1550 may transfer both the request data and the user data. The client application 1532 may interact with the user to generate the user data that it provides.

Figure 15:
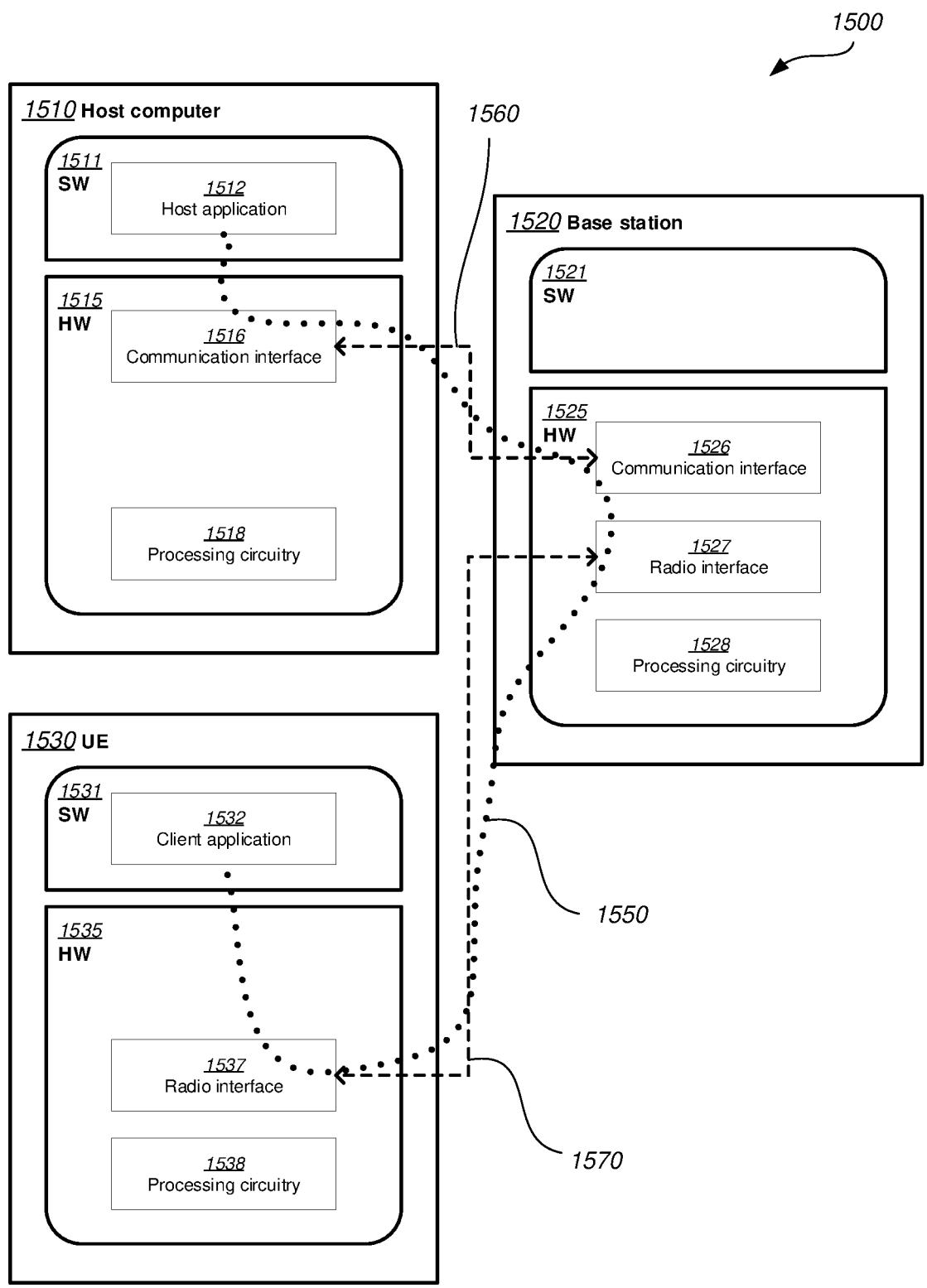
FIG. 15 is a generalized block diagram of a host computer communicating via a base station with a user equipment over a partially wireless connection.

It is noted that the host computer 1510, base station 1520 and UE 1530 illustrated in FIG. 15 may be identical to the host computer 1430, one of the base stations 1412a, 1412b, 1412c and one of the UEs 1491, 1492 of FIG. 14, respectively. This is to say, the inner workings of these entities may be as shown in FIG. 15 and independently, the surrounding network topology may be that of FIG. 14.

In FIG. 15, the OTT connection 1550 has been drawn abstractly to illustrate the communication between the host computer 1510 and the use equipment 1530 via the base station 1520, without explicit reference to any intermediary devices and the precise routing of messages via these devices. Network infrastructure may determine the routing, which it may be configured to hide from the UE 1530 or from the service provider operating the host computer 1510, or both. While the OTT connection 1550 is active, the network infrastructure may further take decisions by which it dynamically changes the routing (e.g., on the basis of load balancing consideration or reconfiguration of the network).

The wireless connection 1570 between the UE 1530 and the base station 1520 is in accordance with the teachings of the embodiments described throughout this disclosure. One or more of the various embodiments improve the performance of OTT services provided to the UE 1530 using the OTT connection 1550, in which the wireless connection 1570 forms the last segment.

A measurement procedure may be provided for the purpose of monitoring data rate, latency and other factors on which the one or more embodiments improve. There may further be an optional network functionality for reconfiguring the OTT connection 1550 between the host computer 1510 and UE 1530, in response to variations in the measurement results. The measurement procedure and/or the network functionality for reconfiguring the OTT connection 1550 may be implemented in the software 1511 of the host computer 1510 or in the software 1531 of the UE 1530, or both. In embodiments, sensors (not shown) may be deployed in or in association with communication devices through which the OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of the OTT connection 1550 may include message format, retransmission settings, preferred routing etc.; the reconfiguring need not affect the base station 1520, and it may be unknown or imperceptible to the base station 1520. Such procedures and functionalities may be known and practiced in the art. In certain embodiments, measurements may involve proprietary UE signaling facilitating the host computer's 1510 measurements of throughput, propagation times, latency and the like. The measurements may be implemented in that the software 1511, 1531 causes messages to be transmitted, in particular empty or 'dummy' messages, using the OTT connection 1550 while it monitors propagation times, errors etc.

Figure 16:
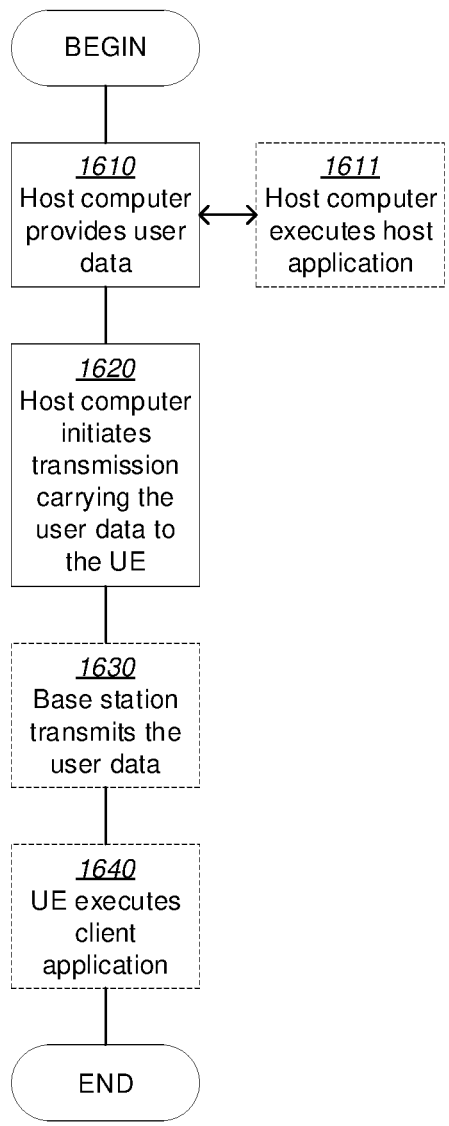
FIGS. 16 to 17 are flowcharts illustrating methods implemented in a communication system including a host computer, a base station and a user equipment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In a first step 1610 of the method, the host computer provides user data. In an optional substep 1611 of the first step 1610, the host computer provides the user data by executing a host application. In a second step 1620, the host computer initiates a transmission carrying the user data to the UE. In an optional third step 1630, the base station transmits to the UE the user data which was carried in the transmission that the host computer initiated, in accordance with the teachings of the embodiments described throughout this disclosure. In an optional fourth step 1640, the UE executes a client application associated with the host application executed by the host computer.

Figure 17:
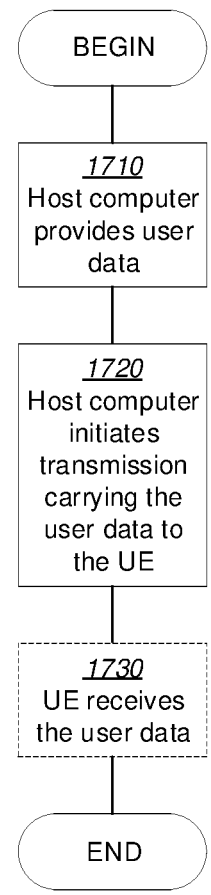

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In a first step 1710 of the method, the host computer provides user data. In an optional substep (not shown) the host computer provides the user data by executing a host application. In a second step 1720, the host computer initiates a transmission carrying the user data to the UE. The transmission may pass via the base station, in accordance with the teachings of the embodiments described throughout this disclosure. In an optional third step 1730, the UE receives the user data carried in the transmission.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method at a network device, the method comprising the network device:
   - determining a first time period corresponding to a subframe in a frame of a first radio access technology (RAT); wherein the first RAT operates in time division duplex (TDD) mode and a first frequency band, and the subframe comprises a guard period (GP) used for switching between downlink and uplink in the frame of the first RAT; and
   - transmitting a downlink system signal of a second RAT in the first time period, wherein the second RAT operates in a second frequency band that at least partially overlaps with the first frequency band;
   - wherein one or more empty symbols are positioned between the downlink system signal and subsequent signals in the frame of the first RAT, wherein no transmission occurs during a third time period corresponding to the one or more empty symbols.

2. A method at a terminal device, the method comprising the terminal device:
- receiving a downlink system signal of a second radio access technology (RAT); wherein the downlink system signal is transmitted in a first time period corresponding to a subframe in a frame of a first RAT; wherein the first RAT operates in time division duplex (TDD) mode and a first frequency band, the subframe comprises a guard period (GP) used for switching between downlink and uplink in the frame, and the second RAT operates in a second frequency band that at least partially overlaps with the first frequency band; and
- obtaining system information of the second RAT from the received downlink system signal;
- wherein one or more empty symbols are positioned between the downlink system signal and subsequent signals in the frame of the first RAT, wherein no transmission occurs during a third time period corresponding to the one or more empty symbols.

3. The method of claim 2, wherein the downlink system signal occupies a second time period that is not configured to transmit system signals according to the first RAT.

4. The method of claim 2, wherein frames of the first RAT are time aligned with frames of the second RAT.

5. The method of claim 2, wherein the one or more empty symbols comprises at least two empty symbols, or the number of the one or more empty symbols depends on a size of a cell of the first RAT.

6. The method of claim 2, wherein the downlink system signal comprises synchronization signals of the second RAT.

7. The method of claim 2, wherein the subframe further comprises a first portion and a second portion.

8. The method of claim 7, wherein the GP is between the first portion and the second portion.

9. The method of claim 7, wherein according to the first RAT:
- the first portion is configured to transmit downlink signals; and/or
- the second portion is configured to transmit uplink signals.

10. The method of claim 8, wherein the downlink system signal is transmitted in a fourth time period corresponding to the GP, a fifth time period corresponding to the first portion of the subframe, and/or a sixth time period corresponding to the second portion of the subframe.

11. The method of claim 10, wherein at least part of the downlink system signal is transmitted in the fourth time period.

12. The method of claim 10, wherein the fifth time period is used to transmit both downlink signals of the first RAT and the downlink system signal.

13. The method of claim 2, wherein the first RAT is Long Term Evolution (LTE), and/or the second RAT is New Radio (NR).

14. The method of claim 10:
- wherein the subframe is a special subframe of Long Term Evolution (LTE) TDD;
- wherein the first portion of the subframe is a downlink pilot time slot (DwPTS); and
- wherein the second portion of the subframe is an uplink pilot time slot (UpPTS).

15. The method of claim 14:
- wherein the special subframe of LTE TDD uses Configuration 0, Configuration 1, Configuration 2, Configuration 3, or Configuration 5; and
- wherein the downlink system signal is transmitted in the fourth time period.

16. The method of claim 14, wherein the downlink system signal is transmitted in the fourth time period and the fifth time period.

17. The method of claim 14:
- wherein the special subframe of LTE TDD uses Configuration 1 or Configuration 6; and
- wherein the fifth time period is used to transmit both the downlink system signal and downlink LTE signals.

18. The method of claim 2, wherein the downlink system signal comprises Synchronization Signal Block (SSB), Channel State Information Reference Signal (CSI-RS), and/or Tracking Reference Signal (TRS).

19. A terminal device, comprising:
- processing circuitry;
- memory containing instructions executable by the processing circuitry whereby the terminal device is operative to:
  - receive a downlink system signal of a second radio access technology (RAT); wherein the downlink system signal is transmitted in a first time period corresponding to a subframe in a frame of a first RAT; wherein the first RAT operates in time division duplex (TDD) mode and a first frequency band, the subframe comprises a guard period (GP) used for switching between downlink and uplink in the frame, and the second RAT operates in a second frequency band that at least partially overlaps with the first frequency band; and
  - obtain system information of the second RAT from the received downlink system signal;
  - wherein one or more empty symbols are positioned between the downlink system signal and subsequent signals in the frame of the first RAT. wherein no transmission occurs during a third time period corresponding to the one or more empty symbols.

* * * * *